(12) United States Patent
Baker

(10) Patent No.: US 9,071,825 B2
(45) Date of Patent: Jun. 30, 2015

(54) TILING OR BLOCKINESS DETECTION BASED ON SPECTRAL POWER SIGNATURE

(75) Inventor: Daniel G. Baker, Beaverton, OR (US)

(73) Assignee: TEKTRONIX, INC., Beaverton, OR (US)

( * ) Notice: Subject to any disclaimer, the term of this patent is extended or adjusted under 35 U.S.C. 154(b) by 403 days.

(21) Appl. No.: 13/454,484

(22) Filed: Apr. 24, 2012

(65) Prior Publication Data

US 2013/0279607 A1 Oct. 24, 2013

(51) Int. Cl.
*H04N 7/12* (2006.01)
*H04N 19/86* (2014.01)
*H04N 19/40* (2014.01)

(52) U.S. Cl.
CPC .......... *H04N 19/00909* (2013.01); *H04N 19/40* (2014.11); *H04N 19/865* (2014.11)

(58) Field of Classification Search
USPC .................................................... 375/240.29
See application file for complete search history.

(56) References Cited

U.S. PATENT DOCUMENTS

| 2004/0017507 A1* | 1/2004 | Clayton | 348/407.1 |
| 2007/0223835 A1* | 9/2007 | Yamada et al. | 382/268 |
| 2010/0202262 A1* | 8/2010 | Adams et al. | 369/47.15 |
| 2011/0249892 A1 | 10/2011 | Chen | |
| 2012/0027103 A1 | 2/2012 | Muni et al. | |

FOREIGN PATENT DOCUMENTS

EP 1111928 A1 6/2001

OTHER PUBLICATIONS

Tan, et al., "Measuring Blocking Artefacts Using Harmonic Analysis", Electronic Letters, IEE Stevenage, GB, vol. 35, No. 16, Aug. 5, 1999, pp. 1322-1323, XP006012504.
European Search Report and Written Opinion for Application No. 13164725.7, dated Oct. 30, 2013, 2 pages.

* cited by examiner

*Primary Examiner* — Tracy Li
(74) *Attorney, Agent, or Firm* — Francis I. Gray; Marger Johnson & McCollom PC

(57) ABSTRACT

Tiling or blockiness detection based on spectral power signature uses one-dimensional vectors at block edges to find a spectral signature created by the tiling or blockiness in an image. A baseband component of the image, such as luminance, is edge enhanced, and then the pixel values along each horizontal line are summed to form a one-dimensional column vector of summed edge values for the image. The power of the column vector and the power of selected frequency components within the column vector are determined. The powers are then combined and converted to dimensionless tiling or blockiness values relative to each of the selected frequencies.

18 Claims, 3 Drawing Sheets

US 9,071,825 B2

TILING OR BLOCKINESS DETECTION BASED ON SPECTRAL POWER SIGNATURE

BACKGROUND OF THE INVENTION

The present invention relates to video compression technology, and more particularly to tiling or blockiness detection based on spectral power signature.

Video signals from an original source, such as a television camera, when digitized, represent a great amount of data. In order to transmit this data to a receiver, the video signals are compressed by coders/decoders (codecs) using one of the well-known video compression techniques, such as H.264 or MPEG2. These compression techniques break the sequence of frames or video images, represented by the video signal, into blocks of data which are each compressed to produce compressed video. However transmission of the compressed video to the receiver most often requires that the data bit-rate is so low that information is lost, i.e., the compression is a "lossy" process. If the loss gets too high, then when the compressed video is decompressed at the receiver by an appropriate codec, the resulting video signal produces frames or video images that have visible artifacts corresponding to the edges of the blocks of data that were originally compressed, commonly referred to as tiling or blockiness.

Broadcast of compressed video streams using a radio frequency (RF) signal, either over the air (OTA) or via cable (CATV), or as data using internet provider (IP) networks, often results in additional data loss at times. This transient data loss may also cause blockiness to be visually apparent on some frames where incomplete transport data is received and decoded, i.e., some of the compressed video data is dropped.

In both cases of over-compression or data loss, the tiling or blockiness may be visually apparent, and distracting to a viewer. To determine the severity level of the impairment of the resulting video signal in a measurement environment, one current method is to compare the alternating current (AC) energy within each compression block with the AC energy between that block and a neighboring block to the right (horizontal edge or H-edge) and between that block and a neighboring block below (vertical edge or V-edge). These H and V energy ratios are summed to create a tiling value for each block. These tiling values are summed over the tiles in each of several regions within a frame to form a grid of tiling values for the image. Typically the largest value is reported as a tiling value for the image or frame. Note, that only tiling that occurs on a block grid aligned with pixel 0,0, i.e., aligned with the upper left corner of the image, is detected, resulting in some problems.

In MPEG2 compression coding, a series of images or frames in the video signal are compressed either individually, as I-frames, or by prediction in relation to surrounding frames estimating translated motion, such as B- or P-frames. Pixel 0,0 tiling is typically the case for a decoder I-frame output. However related P and B frames from the current decode may contain tiling, but the tiles are moved from pixel 0,0 within the frames by motion vectors. Therefore the tiling severity in these frames is not properly indicated. Also there could be tiling from a previously coded/decoded image that has been re-sampled or shifted and cropped as part of a second coding that would go undetected since it is not aligned to pixel 0,0. Finally, if there is tiling from a previous coded/decoded process where the image has been resized, such as a 1080i (interlaced) to 720p (progressive) conversion, then the tiling would go undetected at the decoder output since the block or tile sizes are no longer on the same grid spacing as the original compression process.

FIG. 1 represents a typical situation that results in the inability to detect tiling according to the present, above-mentioned, technology. An MPEG2 signal, representing original video that has been compressed, is input to a decoder to produce component video signals, such as Y, U and V signals. The decoder creates tiling, as shown in the Y-frame image representing the baseband video from the decoder. Since MPEG2 is based upon 8×8 tiles (or possibly 16×16 tiles), the resulting Y-frame image is a composite of decoded 8×8 tiles. In this situation the Y-frame represents a 1080i video signal (1080 lines by 1920 columns). An intermediary, such as a cable television company, may then resize the 1080i video signal to produce a 720p video signal (720 lines by 1280 columns). Visible tiling artifacts on the boundaries of the original 8×8 tiles are resized to ⅔(8×8) tiles. This 720p video signal is then encoded to produce an MPEG2 signal that is transmitted to an end user television set. The end user decodes the MPEG2 signal to produce the final version for viewing, which includes both the visible artifacts of the re-sized tiles (⅔(8×8)) as well as the 8×8 tiles from the decoder. The result may be an image that has a lot of visible ⅔(8×8) tile artifacts, which are not detected by the current techniques.

What is needed is a method of detecting the severity of tiling or blockiness in a decoded compressed video signal due to over-compression or data-loss at a decoder output that is insensitive to the phase-shift or alignment of the tiling pattern to pixel 0,0 and responsive to some of the typical image resizing ratios.

BRIEF SUMMARY OF THE INVENTION

Accordingly the present invention provides tiling or blockiness detection by spectral power signature using one-dimensional vectors at block edges to find a spectral signature created by the tiling or blockiness in an image. A baseband component of the image, such as luminance, is edge enhanced, and then the pixel values along each horizontal line are summed to form a one-dimensional column vector of summed edge values for the image. The power of the column vector and the power of selected frequency components within the column vector are determined. The powers are then combined and converted to dimensionless values to produce a tiling or blockiness value relative to each of the selected frequencies.

The objects, advantages and other novel features of the present invention are apparent from the following detailed description when read in conjunction with the appended claims and attached drawing figures.

DETAILED DESCRIPTION OF THE INVENTION

The method described herein provides tiling or blockiness impairment level detection in both currently decoded as well as previously coded/decoded images, regardless of the alignment of the tiling pattern to pixel 0,0 (in-situ). A one-dimensional column vector is generated representing the absolute values of horizontally aligned edges in the image for each frame of the baseband video signal to find a spectral signature, similar to fast Fourier transform (FFT) coefficients, of the small set of vertical spatial frequencies created by tiling (8-line patterns) or macro-blocking (16-line patterns). It also looks for 2/3 and 3/2 frequency components due to typical image resizing from 1080i or 1080p to 720p formats and vice-versa to separately indicate pre-coded tiling or macroblocking.

Figure 1:
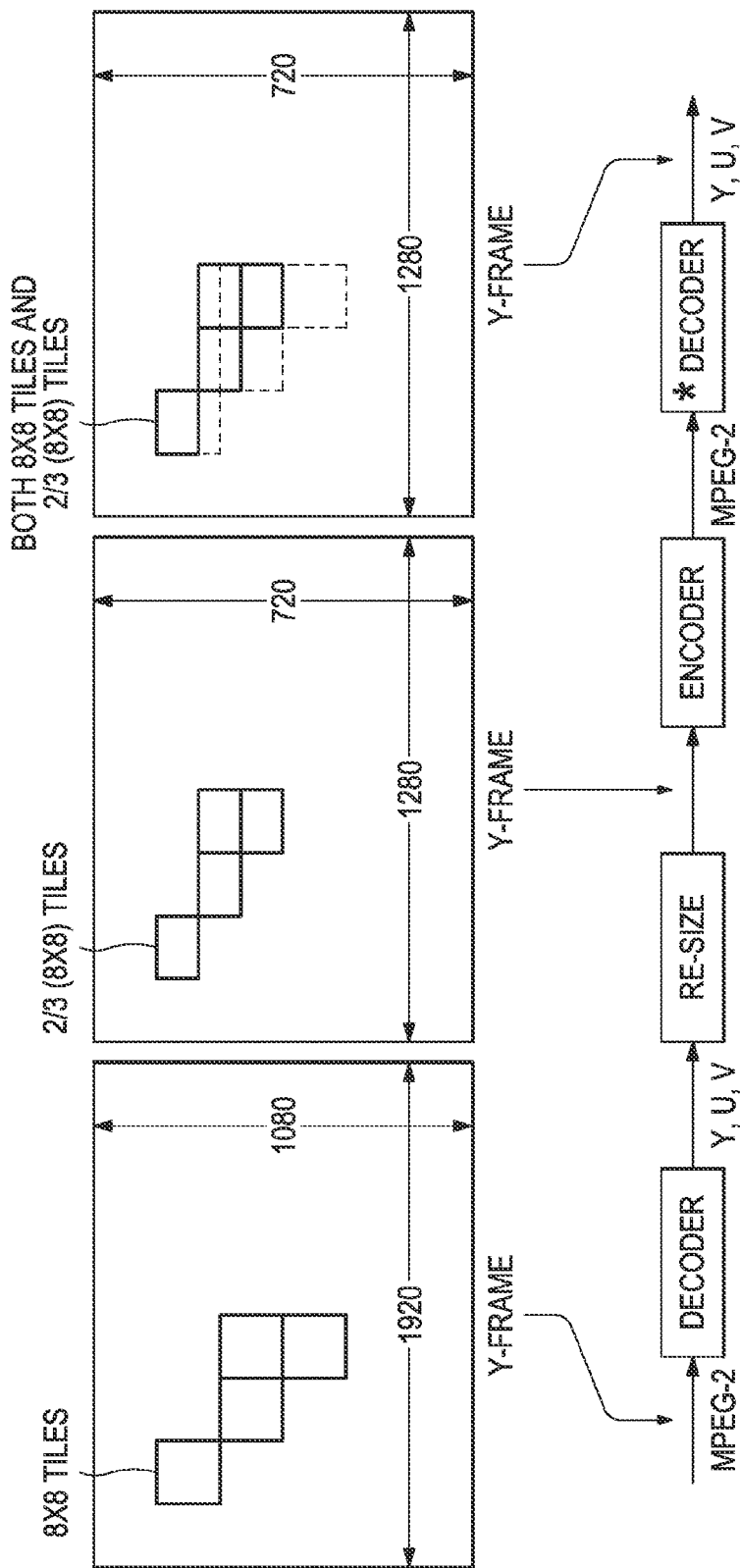
FIG. 1 is a block diagram view of a typical television distribution system that produces typical tiling or blockiness artifacts.
Figure 2:
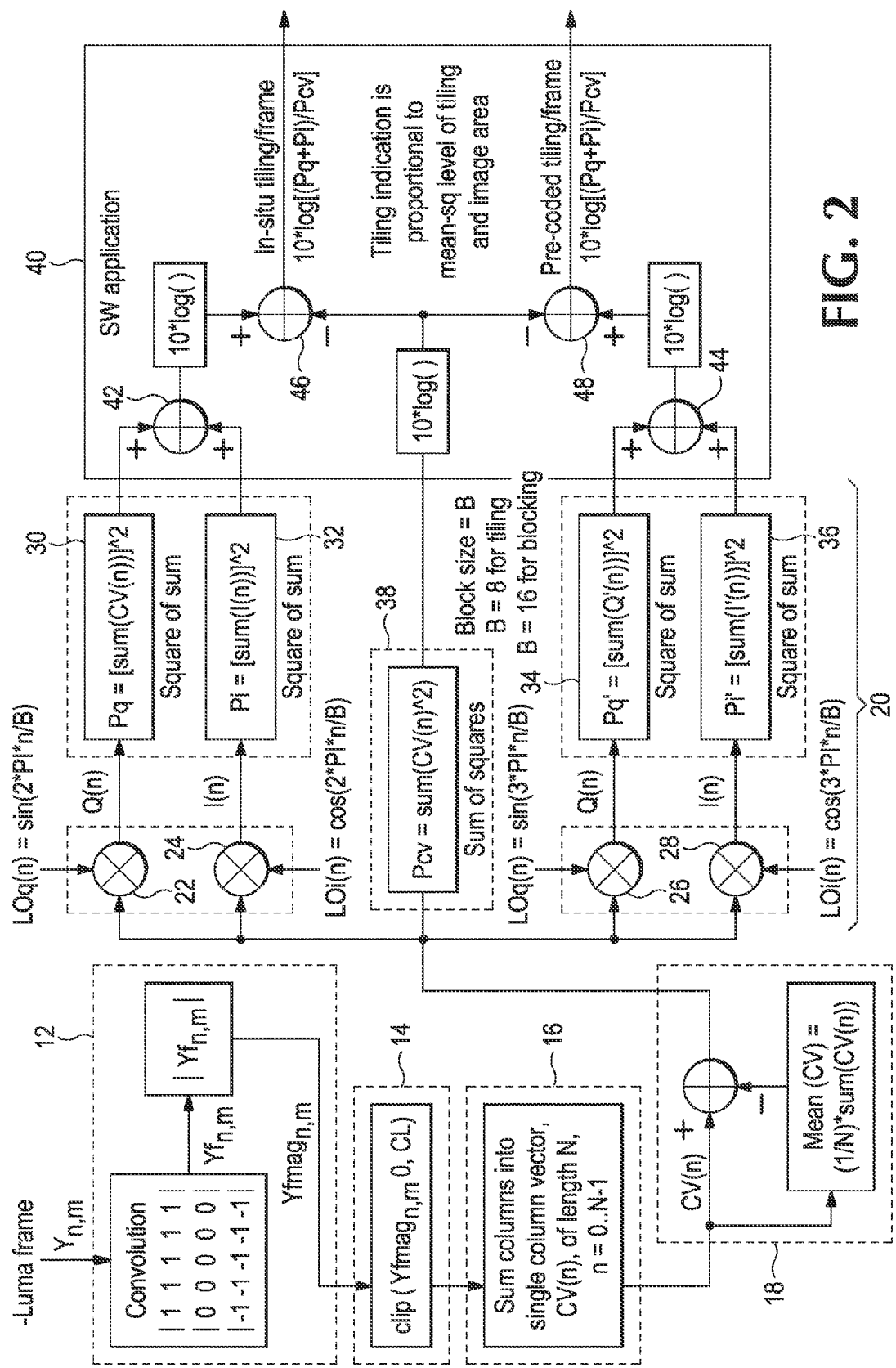
FIG. 2 is a block diagram view of a system for tiling or blockiness detection according to the present invention.
Figure 3:
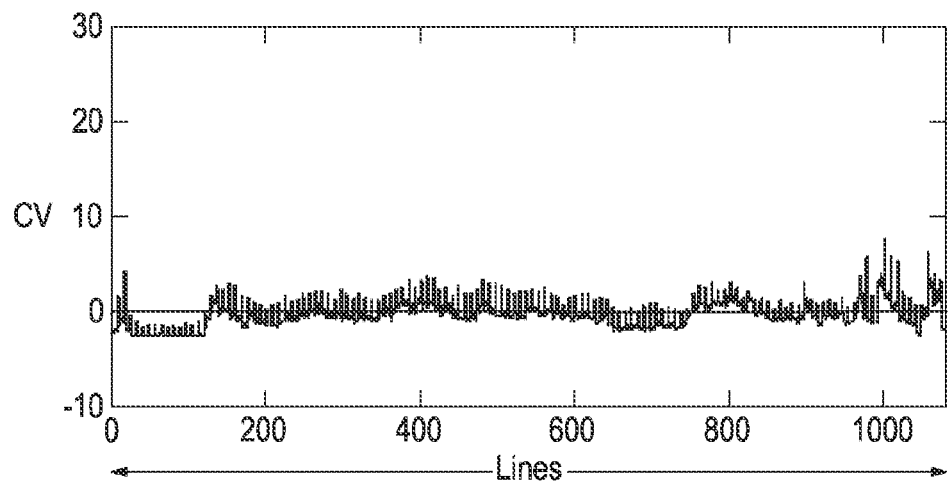
FIG. 3 is a graphic view of values for a column vector of edge values according to the present invention.

Referring now to FIG. 2 a decoded baseband video component, such as the luminance (Y) two-dimensional image component decoded from a compressed video signal—such as an MPEG2 signal, is input to an edge detector 12 to enhance vertical edges along each horizontal line. The absolute values for the resulting pixels from the edge detector 12 are optionally input to a clipper 14 to limit the values, i.e., reduce the dynamic range, and then input to a summer 16 to produce the one-dimensional (1D) column vector, CV(n), a representation of which is shown in FIG. 3 with a DC component removed. Therefore for a 1080i or 1080p image frame there are 1080 values in the 1D column vector, one summed value for each horizontal line, i.e., n=0 . . . , N−1. A typical edge detector 12 has a 2D filter kernel:

$kdbt=[1,1,1,1,1][0,0,0,0,0][-1,-1,-1,-1,-1].$

The clipper 14, if used, may have a clip level, CL=30, for 8-bit pixels. The column vector, CV, may be processed by a mean eliminator 18 to remove any DC component, i.e., CV(n)−Mean(CV) where Mean(CV)=(1/N)*sum(CV(n)).

The resulting CV from the mean eliminator 18 is input to a simple spectrum evaluator 20 that detects a frequency component of the column vector values corresponding to the tiling or blockiness factor, 8 or 16, or to a resizing factor, 2/3 or 3/2. FIG. 2 only shows, by way of illustration, the spectrum evaluator 20 for detecting in-situ tiling or blockiness and 2/3 resizing blockiness. Local oscillators at periods of B and 2/3B lines are used to generate complex sine and cosine signals, $LOq(n)=\sin(2*pi*n/B), LOi(n)=\cos(2*pi*n/B),$ $LOq(n)=\sin(3*pi*n/b), LOi(n)=\cos(3*pi*n/B),$ which are input to respective multipliers 22, 24, 26, 28 to down-convert the column vector CV to complex baseband real and imaginary parts. The outputs from the in-situ multipliers 22, 24 are input to respective square summers 30, 32 to produce the square of the sums, $Pq=[\text{sum}(Q(n))]^2$ and $Pi=[\text{sum}(I(n))]^2.$ Likewise the outputs from pre-coded multipliers 26, 28 are input to respective square summers 34, 36 to produce the square of the sums, $P'q=[\text{sum}(Q'(n))]^2$ and $P'i=[\text{sum}(I'(n))]^2.$ Pq, Pi and P'q, P'i represent the baseband power for each down conversion. The column vector CV also is input to a square summer 38 to produce the sum of squares, $Pcv=\text{sum}(CV(n)^2)$ which represents the total column vector power.

The respective square of the sums, Pq, Pi and P'q, P'I, are input to respective summers 42, 44, which may be part of a software application 40 running on a processor, with the outputs being converted to logarithmic values as is the output Pcv. The in-situ tiling value per frame is produced by a subtractor 46 which has as inputs the log value for the in-situ summer 42 and the log value for Pcv, while the pre-coded tiling value per frame is produced by a subtractor 48 which has as inputs the log value for the pre-coded summer 44 and the log value for Pcv. As shown the in-situ tiling value may be represented by $10*\log[(Pq+Pi)/Pcv],$ and the pre-coded tiling value may be represented by $10*\log[(P'q+PI)/Pcv].$ The results are dimensionless power ratios in logarithmic form.

Figure 4:
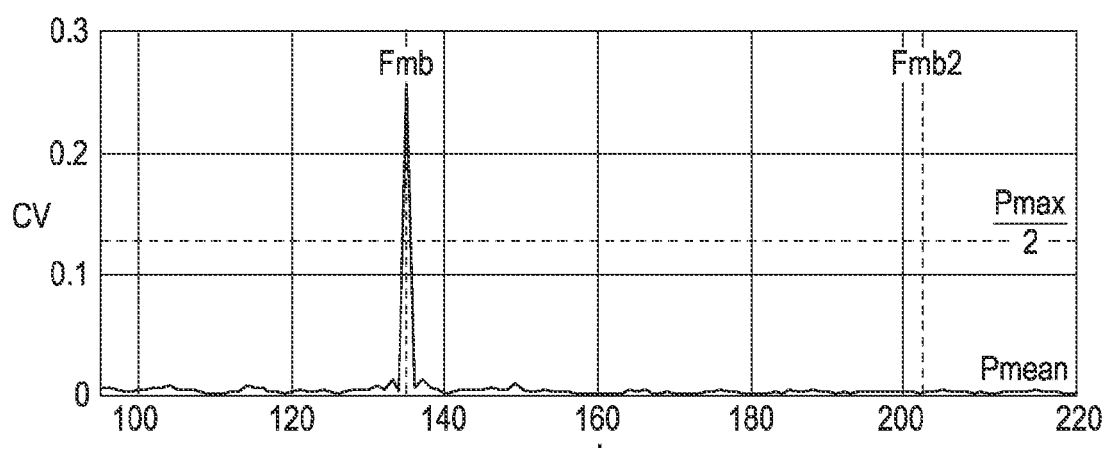
FIG. 4 is a graphic view of a linear spectral plot of the column vector according to the present invention.

FIG. 4 is a linear spectral plot of horizontal edge power for a column vector taken from a 1080 line image. The x-axis is the vertical spatial frequency or, for simplicity, frequency in units of cycles per image height. For example, an 8-line repeating pattern in an image with 1080 lines creates a frequency of 1080/8, which is 135 cycles per image height. Markers, Fmb and Fmb2, are indicated for the in-situ frequency and the pre-coded frequency, respectively. In this example, there is only the spike at the in-situ frequency, indicating tiling on the 8×8 in-situ tiling blocks and essentially no tiling at higher frequencies.

Figure 5:
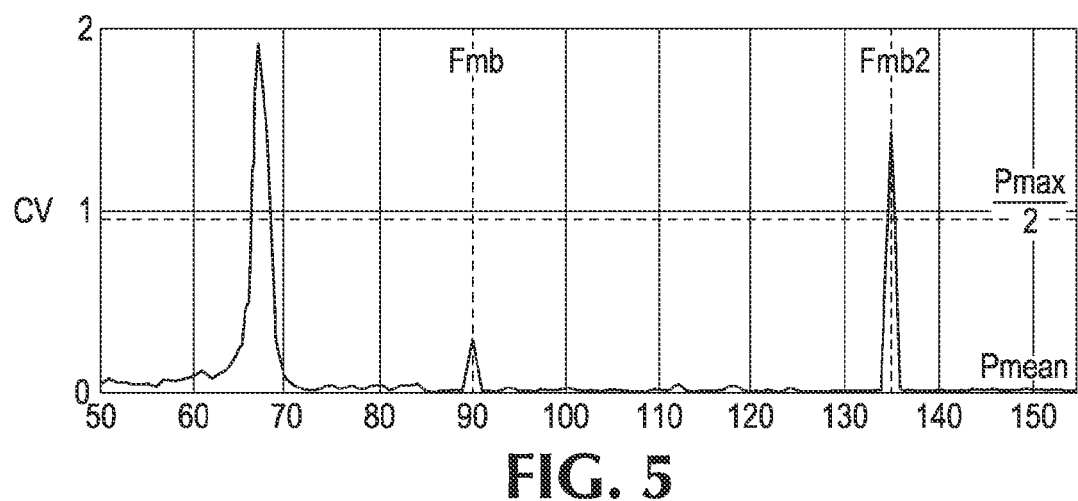
FIG. 5 is a graphic view of another linear spectral plot of the column vector according to the present invention.

FIG. 5 is a comparable linear spectral plot for a different 720 line image, but now there is a significant spike at Fmb2, 720/5.333 or 135 cycles/height, potentially indicating tiling at the 2/3(8×8) or 5.333 lines due to pre-coded blocking. There is an even larger spike at 720/10.667 or 67.5 cycles/height, indicating tiling at the 2/3(16×16) or 10.667 lines due to pre-coded blocking. The spike at Fmb2 is the second harmonic of the spike at 67.5 cycles/height, and both spikes were created by pre-coded tiling artifacts on a 16×16 grid originally in a 1080 line image that was re-sized to 720 lines, creating an edge pattern that repeats every 2/3(16) or 10.667 lines. Therefore, either pre-coded 16×16 tiling or 8×8 tiling on a 1080 line image converted to 720 lines is detectable by the spike at Fmb2, since any pre-coded 16×16 tiling edges have significant harmonic content. A small spike is seen at Fmb, indicating only a relatively small amount of in-situ 8×8 tiling.

Since only specific frequencies are of interest, there is no need to use an FFT to generate the spectral power signatures. Therefore the invention as shown runs in real-time. Only magnitude is measured, so the tiling results are independent of phase, i.e., of any vertical shift. Likewise the present invention is independent of any horizontal size change or horizontal cropping. Although the above description produces a 1D column vector representing edge values along each horizontal line, the same process may be applied to produce a 1D column vector for each vertical column of pixels in the image frame. Further, the frame may be segmented along image height to separately produce a tiling value for each segment. The amplitude of the spectral power signature at any of the indicated frequencies that is above a specified value may be reported as a tiling or blockiness factor together with the predetermined frequency, where the specified value may be determined empirically as a level at which visible artifacts start to be noticeable to a viewer.

Thus the present invention provides tiling or blockiness detection based on spectral power signature by generating a one-dimensional column vector of edge values across an image, determining the power at predetermined frequencies for the 1D column vector, and subtracting the column vector power from the power at each of the predetermined frequencies to produce a tiling or blockiness value, converted to a dimensionless value, for each of the predetermined frequencies.

What is claimed is:

1. A computer-implemented method of detecting tiling or blockiness in an image comprising executing on a processor the steps of:
generating from a column vector generator a column vector of edge values for the image;
inputting the column vector into a power determiner;
determining from the power determiner a power value for the column vector and a power value for each of a group of predetermined frequencies by:
calculating the power value from an AC component of the column vector by:
determining a mean value for the column vector from the edge values,
subtracting the mean value from each edge value in the column vector to produce the AC component of the column vector, and
producing the power value for the column vector as the sum of the squares of the values for the AC component of the column vector,
calculating power values for I and Q components of the AC component of the column vector at each of the predetermined frequencies, and
summing the power values for the I and Q components of each predetermined frequency to produce the power value for each predetermined frequency; and
combining via a combiner the power values to produce a tiling or blockiness value for each of the predetermined frequencies.

2. The computer-implemented method as recited in claim 1 wherein the generating step comprises executing on the processor the steps of:
enhancing edges along each horizontal line of the image to produce edge pixels having enhanced values; and
summing the edge pixels along each horizontal line to produce a pixel sum for each horizontal line, the pixel sums for all the horizontal lines forming the edge values of the column vector.

3. The computer-implemented method as recited in claim 2 wherein the generating step further comprises the step of converting the enhanced values to absolute enhanced values for edge pixels prior to the summing step.

4. The computer-implemented method as recited in claim 3 wherein the generating step further comprises the step of clipping the absolute enhanced values prior to the summing step to reduce dynamic range.

5. The computer-implemented method as recited in claim 1 wherein the I and Q component power value calculating step comprises executing on the processor the steps of:
down-converting the AC component of the column vector as a function of block size and predetermined frequency to produce the I and Q components for each of the predetermined frequencies;
producing the power value for each of the I and Q components as the sum of the squares of the values for the I and Q components; and
summing the I and Q components for each predetermined frequency to produce the power values for each predetermined frequency.

6. The computer-implemented method as recited in claim 1 wherein the combining step comprises executing on the processor the steps of:
converting the power values for the column vector and for each of the predetermined frequencies into dimensionless quantities; and
subtracting the dimensionless quantity for the column vector from each of the dimensionless quantities for the predetermined frequencies to produce the tiling or blockiness value for each of the predetermined frequencies.

7. An apparatus for detecting tiling or blockiness in an image comprising:
means for generating a column vector of edge values for the image;
means for determining from the column vector a power value for the column vector and a power value for each of a group of predetermined frequencies, the determining means including:
means for calculating the power value from an AC component of the column vector, the column vector power value calculating means comprises:
means for determining a mean value for the column vector from the edge values;
means for subtracting the mean value from each edge value in the column vector to produce the AC component of the column vector, and
means for producing the power value for the column vector as the sum of the squares of the values for the AC component of the column vector,
means for calculating power values for I and Q components of the column vector at each of the predetermined frequencies, and
means for summing the power values for the I and Q components of each predetermined frequency to produce the power value for each predetermined frequency; and
means for combining the power values to produce a tiling or blockiness value for each of the predetermined frequencies.

8. The apparatus as recited in claim 7 wherein the generating means comprises:
means for enhancing edges along each horizontal line of the image to produce edge pixels having enhanced values; and
means for summing the edge pixels along each horizontal line to produce a pixel sum for each horizontal line, the pixel sums for all the horizontal lines forming the edge values of the column vector.

9. The apparatus as recited in claim 8 wherein the generating means further comprises means for converting the enhanced values to absolute enhanced values for the edge pixels prior to input to the summing means.

10. The apparatus as recited in claim 9 wherein the generating means further comprises means for clipping the absolute enhanced values prior to the summing means to reduce dynamic range.

11. The apparatus as recited in claim 7 wherein the I and Q component power value calculating means comprises:
means for down-converting the AC component of the column vector as a function of block size and predetermined frequency to produce the I and Q components for each of the predetermined frequencies;
means for producing the power value for each of the I and Q components as the sum of the squares of the values for the I and Q components; and
means for summing the I and Q components for each predetermined frequency to produce the power values for each predetermined frequency.

12. The apparatus as recited in claim 7 wherein the combining means comprises:
means for converting the power values for the column vector and for each of the predetermined frequencies into dimensionless quantities; and means for subtracting the dimensionless quantity for the column vector from each of the dimensionless quantities for the predetermined frequencies to produce the tiling or blockiness value for each of the predetermined frequencies.

13. An apparatus for detecting tiling or blockiness in an image comprising:
- a column vector generator having as an input data representing the image and providing as an output a column vector of edge values for the image;
- a power determiner having as an input the column vector and providing as outputs a power value for the column vector and for predetermined frequencies within the column vector, the power determiner includes:
  - a first power calculator having as an input an AC component of the column vector and having as an output the power value for the column vector, the first power calculator includes:
    - a DC determiner having the edge values of the column vector as an input and producing a mean value of the edge values as an output,
    - a subtractor having as a first input the edge values of the column vector and as a second input the mean value to produce the AC component of the column vector as the difference of the edge values and the mean value as an output, and
    - a power generator having the AC component as an input and producing the power value for the column vector as the sum of the squares of the edge values for the AC component of the column vector as an output,
  - a second power calculator having as an input the AC component of the column vector and having as outputs power values for I and Q components of the column vector at each of the predetermined frequencies, and
  - a summer having as inputs the power values for the I and Q components of each predetermined frequency and having as outputs the power values for each predetermined frequency; and
- a combiner having as inputs the power values for the column vector and the predetermined frequencies, and providing as outputs a tiling or blockiness value for each of the predetermined frequencies.

14. The apparatus as recited in claim 13 wherein the column vector generator comprises:
- an edge filter having as an input the data representing the image, the edge filter enhancing edges along each horizontal line of the image, and having as an output edge pixels having enhanced values; and
- a summer having as an input the edge pixels along each horizontal line and having as an output a pixel sum for each horizontal line, the pixel sums for all the horizontal lines forming the edge values of the column vector.

15. The apparatus as recited in claim 14 wherein the column vector generator further comprises an absolute value converter having as an input the enhanced values and having as an output absolute enhanced values for the edge pixels for input to the summer.

16. The apparatus as recited in claim 15 wherein the column vector generator further comprises a clipper having as an input the absolute enhanced values and having as an output clipped absolute enhanced values to reduce dynamic range prior to input to the summer.

17. The apparatus as recited in claim 13 wherein the second power calculator comprises:
- a down-converter for each predetermined frequency, each down-converter having the AC component of the column vector as an input together with a local oscillator frequency that is a function of block size and the predetermined frequency, and having as outputs the I and Q components for the predetermined frequency;
- a power generator for each predetermined frequency having as inputs the I and Q components for the predetermined frequency and producing as outputs the power value for each of the I and Q components as the sum of the squares of the values for the I and Q components; and
- a combiner for each predetermined frequency having as inputs the I and Q components for the predetermined frequency and having as an output the power value for the predetermined frequency.

18. The apparatus as recited in claim 13 wherein the combiner comprises:
- a converter for each predetermined frequency and the column vector, each converter having as an input the respective power values to produce as an output a dimensionless value; and
- a subtractor for each predetermined frequency, each subtractor having as inputs the dimensionless value for the column vector and for the predetermined frequency and having as an output the tiling or blockiness value for the predetermined frequency.

* * * * *